(12) United States Patent
Brown et al.

(10) Patent No.: US 9,262,048 B1
(45) Date of Patent: *Feb. 16, 2016

(54) SYSTEM FOR MONITORING AND DISPLAYING A PLURALITY OF TAGGED TELECOMMUNICATION ASSETS

(71) Applicant: UTEC SURVEY, INC., Houston, TX (US)

(72) Inventors: Douglas John Brown, Livingston (GB); Gregory Hammond, Livingston (GB); David Patrick Cahill, Livingston (GB)

(73) Assignee: UTEC SURVEY, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,508

(22) Filed: Jan. 21, 2015

Related U.S. Application Data

(60) Provisional application No. 61/929,879, filed on Jan. 21, 2014.

(51) Int. Cl.
*G06F 17/30* (2006.01)
*G06F 3/0481* (2013.01)
*G06F 17/22* (2006.01)

(52) U.S. Cl.
CPC ........ *G06F 3/04817* (2013.01); *G06F 17/2235* (2013.01)

(58) Field of Classification Search
CPC . G06F 17/2234; G01C 21/3638; G06Q 50/08
USPC ......................................................... 715/847
See application file for complete search history.

(56) References Cited

U.S. PATENT DOCUMENTS

| | | | | |
|---|---|---|---|---|
| 6,694,264 B2* | 2/2004 | Grace | ..................... | G06T 17/20 345/419 |
| 7,286,158 B1* | 10/2007 | Griebenow | ........ | G07C 9/00103 340/505 |
| 7,924,149 B2* | 4/2011 | Mendelson | .......... | G01C 21/206 340/539.11 |
| 7,982,614 B2* | 7/2011 | Holm | ..................... | G01V 15/00 340/572.4 |
| 8,532,962 B2* | 9/2013 | Zhang | ................. | G06F 17/5004 434/72 |
| 8,538,687 B2* | 9/2013 | Plocher | .................. | G01C 21/20 701/433 |
| 2005/0132305 A1* | 6/2005 | Guichard et al. | ............. | 715/855 |
| 2007/0185980 A1* | 8/2007 | Abraham | ............ | H04L 41/0816 709/222 |
| 2009/0216775 A1* | 8/2009 | Ratliff | ..................... | G06Q 10/08 |
| 2010/0114493 A1* | 5/2010 | Vestal | ............................. | 702/9 |
| 2010/0153126 A1* | 6/2010 | Garrett | ................... | G06Q 50/08 705/1.1 |
| 2011/0276264 A1* | 11/2011 | Plocher | ................ | G01C 21/206 701/533 |

* cited by examiner

*Primary Examiner* — Sheree Brown
(74) *Attorney, Agent, or Firm* — Buskop Law Group, P.C.; Wendy Buskop

(57) ABSTRACT

A system for monitoring and displaying a plurality of telecommunication assets on at least one telecommunication structure by creating a customer profile and a library of survey set ups and storing information from independent survey set ups mounted on or proximate to the offshore asset on the administrative data storage. The system includes creating a library of tagged assets for the offshore asset using at least one independent survey set up, wherein each tagged asset has an icon with a hyperlink to a library of images. The system includes identifying placement locations on offshore assets and forming an executive dashboard for display on at least one client device, wherein a virtually positioned icon positioned on an image of the tagged assets presents a hyperlink to the library of survey set ups for that tagged asset, thereby enabling toggling from the image to the library of survey set ups.

19 Claims, 10 Drawing Sheets

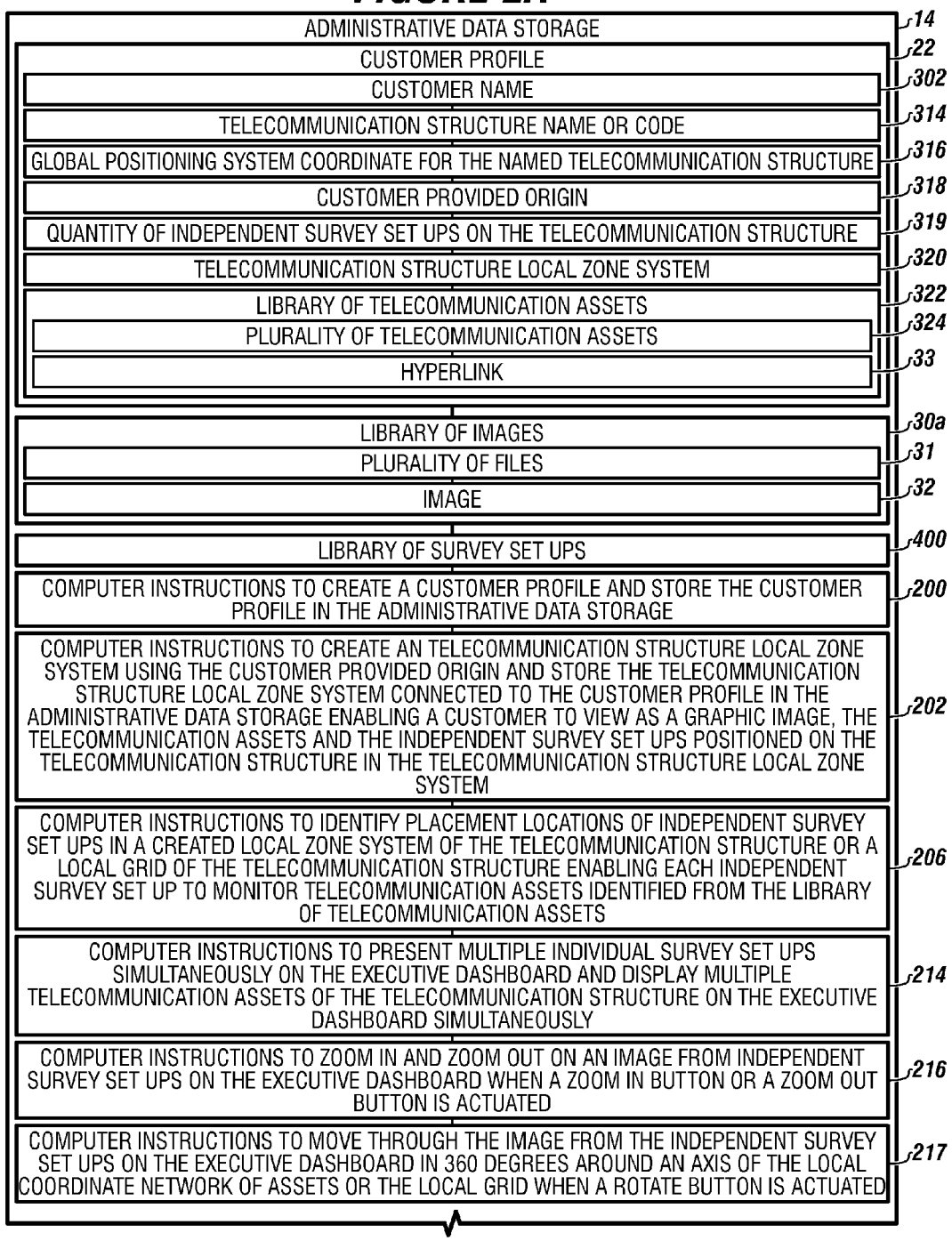

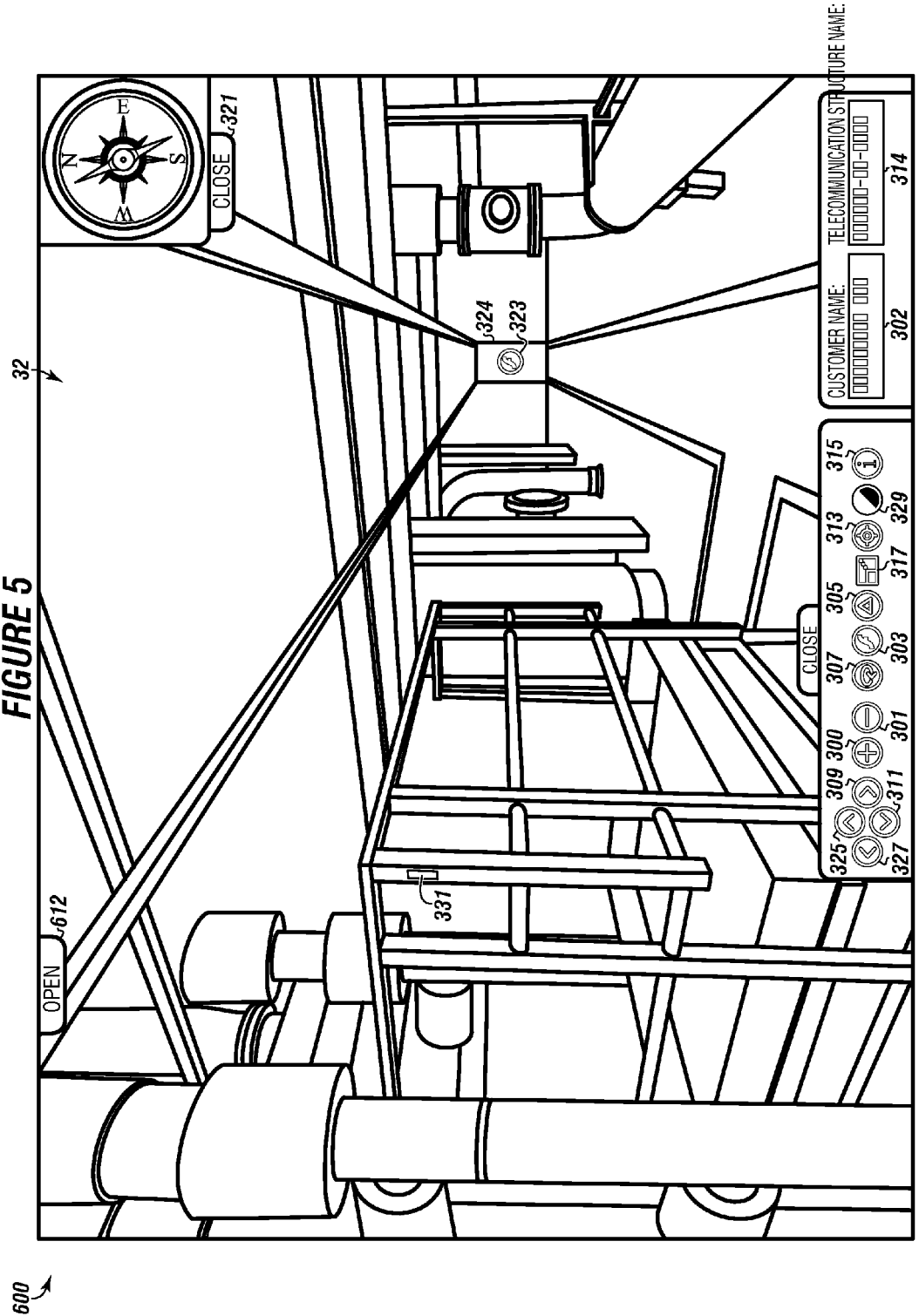

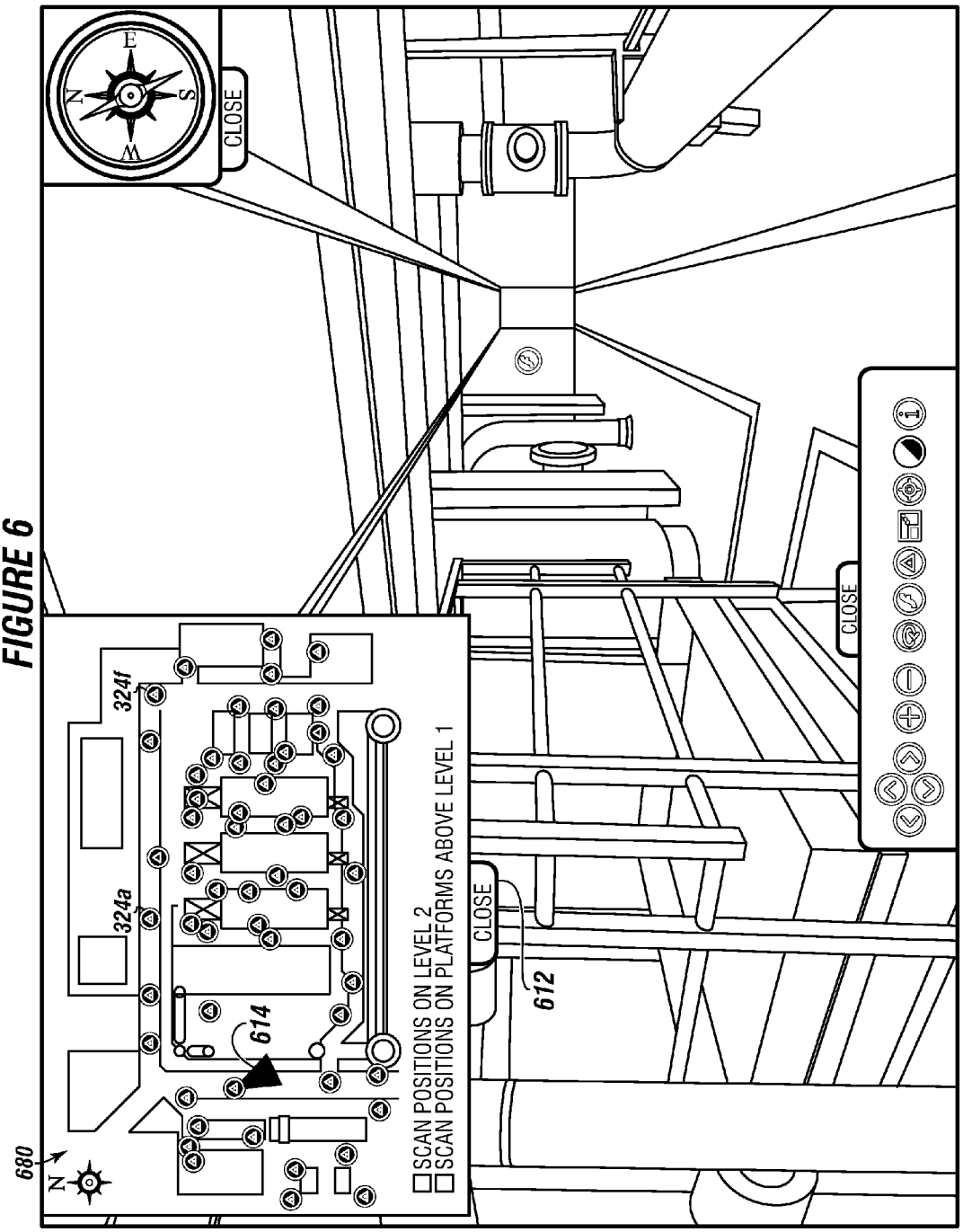

FIGURE 7A

| | |
|---|---|
| CREATING A CUSTOMER PROFILE WHICH IS STORED IN THE ADMINISTRATIVE DATA STORAGE OR IN A CLOUD COMPUTING DATA STORAGE | 801 |
| PROVIDING AN TELECOMMUNICATION STRUCTURE NAME AND TELECOMMUNICATION STRUCTURE ADDRESS FOR A TELECOMMUNICATION STRUCTURE TO BE SURVEYED | 803 |
| IDENTIFYING A CUSTOMER PROVIDED ORIGIN ON THE TELECOMMUNICATION STRUCTURE FOR SURVEYING | 805 |
| IDENTIFYING AREAS OF THE TELECOMMUNICATION STRUCTURE FOR MONITORING, SUCH AS SURVEYING | 807 |
| USING AN EXECUTIVE DASHBOARD CREATED USING COMPUTER INSTRUCTIONS IN THE ADMINISTRATIVE DATA STORAGE TO REQUEST SURVEYING OF IDENTIFIED PORTIONS OF THE TELECOMMUNICATION STRUCTURE WITH THE TELECOMMUNICATION STRUCTURE ADDRESS | 809 |
| REQUESTING CREATION AND INSTALLATION OF INDEPENDENT SURVEY SET UPS ON THE TELECOMMUNICATION STRUCTURE WHICH TARGET CUSTOMER IDENTIFIED TELECOMMUNICATION ASSETS | 810 |
| USING COMPUTER INSTRUCTIONS IN THE ADMINISTRATIVE DATA STORAGE TO INSTRUCT THE ADMINISTRATIVE PROCESSOR TO CREATE A TELECOMMUNICATION STRUCTURE LOCAL ZONE SYSTEM FOR THE IDENTIFIED AREAS OF THE TELECOMMUNICATION STRUCTURE LOCAL ZONE SYSTEM OR THE LOCAL GRID | 811 |
| USING COMPUTER INSTRUCTIONS IN THE ADMINISTRATIVE DATA STORAGE TO INSTRUCT THE ADMINISTRATIVE PROCESSOR TO IDENTIFY OPTIMUM LOCATIONS TO PLACE INDEPENDENT SURVEY SET UPS WITH DATA CAPTURE DEVICES ORIENTED AT THE CUSTOMER IDENTIFIED TELECOMMUNICATION ASSETS | 812 |
| USING COMPUTER INSTRUCTIONS IN THE ADMINISTRATIVE DATA STORAGE TO INSTRUCT THE ADMINISTRATIVE PROCESSOR TO VERIFY IF INDEPENDENT SURVEY SET UPS CAN BE AT THE OPTIMUM LOCATIONS OR IF INDEPENDENT SURVEY SET UPS MUST BE MOVED TO DIFFERENT LOCATIONS IN ORDER TO CAPTURE MORE CUSTOMER IDENTIFIED TELECOMMUNICATION ASSETS PROVIDING A MAXIMUM COVERAGE FOR A CUSTOMER IDENTIFIED AREA OF A TELECOMMUNICATION STRUCTURE | 813 |
| "TURNING ON", SUCH AS POWERING UP, THE INDEPENDENT SURVEY SET UPS TO PERFORM DATA CAPTURE OF THE CUSTOMER IDENTIFIED TELECOMMUNICATION ASSETS | 814 |
| TRANSFERRING DATA FROM OPERATING INDEPENDENT SURVEY SET UPS TO THE ADMINISTRATIVE DATA STORAGE | 815 |
| GENERATING A LIBRARY OF SURVEY SET UPS USING INFORMATION ON THE INDEPENDENT SURVEY SET UPS AND USING COMPUTER INSTRUCTIONS IN THE ADMINISTRATIVE DATA STORAGE AND STORING THE LIBRARY OF SURVEY SET UPS IN THE ADMINISTRATIVE DATA STORAGE | 816 |
| USING COMPUTER INSTRUCTIONS IN THE ADMINISTRATIVE DATA STORAGE TO INSTRUCT THE ADMINISTRATIVE PROCESSOR TO CREATE A PLAN VIEW OF ALL OR A PORTION OF THE INDEPENDENT SURVEY SET UPS FROM THE LIBRARY OF SURVEY SET UPS CAN BE CREATED | 817 |
| COMPUTER INSTRUCTIONS IN THE ADMINISTRATIVE DATA STORAGE TO INSTRUCT THE ADMINISTRATIVE PROCESSOR TO ENABLE A PLAN VIEW TO BE VIEWED SIMULTANEOUSLY WITH THE DATA FROM ONE OR MORE OPERATING INDEPENDENT SURVEY SET UPS USING THE EXECUTIVE DASHBOARD | 818 |

(7B)

(7A)

| USING COMPUTER INSTRUCTIONS IN THE ADMINISTRATIVE DATA STORAGE TO INSTRUCT THE ADMINISTRATIVE PROCESSOR TO FORM A LIBRARY OF TELECOMMUNICATION ASSETS FOR THE SPECIFIC TELECOMMUNICATION STRUCTURE BEING SURVEYED WITH THE INDEPENDENT SET UPS | 820 |

| CREATING AN ICON CONNECTED TO THE LIBRARY OF TELECOMMUNICATION ASSETS AND INSTALLING THE ICON VIRTUALLY OVER THE IMAGE OF THE TELECOMMUNICATION ASSET GENERATED FROM THE DATA CAPTURE DEVICE, WHICH CAN ALSO INCLUDE CREATING A HYPERLINK FOR THE ICON TO THE LIBRARY OF IMAGES AND THE CUSTOMER PROFILE IN THE ADMINISTRATIVE DATA STORAGE | 821 |

| USING COMPUTER INSTRUCTIONS AND THE EXECUTIVE DASHBOARD TO ACCESS AND VIEW RELATED DATA OF THE TELECOMMUNICATION STRUCTURES SUCH AS SPECIFICATION DATA, WHILE VIEWING THE DATA CAPTURE IMAGES AND THE PLAN VIEW SIMULTANEOUSLY FROM A PLURALITY OF CLIENT DEVICES OF THE CUSTOMER, SIMULTANEOUSLY | 824 |

SYSTEM FOR MONITORING AND DISPLAYING A PLURALITY OF TAGGED TELECOMMUNICATION ASSETS

CROSS REFERENCE TO RELATED APPLICATIONS

The current application claims priority to and the benefit of U.S. Provisional Patent Application Ser. No. 61/929,879 filed on Jan. 21, 2014, entitled "SYSTEM FOR MONITORING AND DISPLAYING A PLURALITY OF TAGGED TELECOMMUNICATION ASSETS." This reference is hereby incorporated in its entirety.

FIELD

The present embodiments generally relate to a system for monitoring and displaying a plurality of individual telecommunication assets on at least one telecommunication structure.

BACKGROUND

A need exists for a monitoring system for specific individual telecommunication assets on a telecommunication structure which uses laser scanning, video collection and other tools, including sonar in real time, and presents the images and related data to a user using a client device, wherein the client device can be remote from the telecommunication structure or on the telecommunication structure.

The present embodiments meet these needs.

BRIEF DESCRIPTION OF THE DRAWINGS

The detailed description will be better understood in conjunction with the accompanying drawings as follows:

FIGS. 2A-2C depicts the administrative data storage usable in the system.

FIG. 5 depicts an embodiment of the executive dashboard with real time displays of multiple telecommunication assets associated with a telecommunication structure.

FIG. 6 depicts an embodiment of the executive dashboard with a plan view.

FIG. 7A-7B depicts an embodiment of an executive dashboard with a detail of telecommunication structures with multiple survey set ups.

Figure 1:
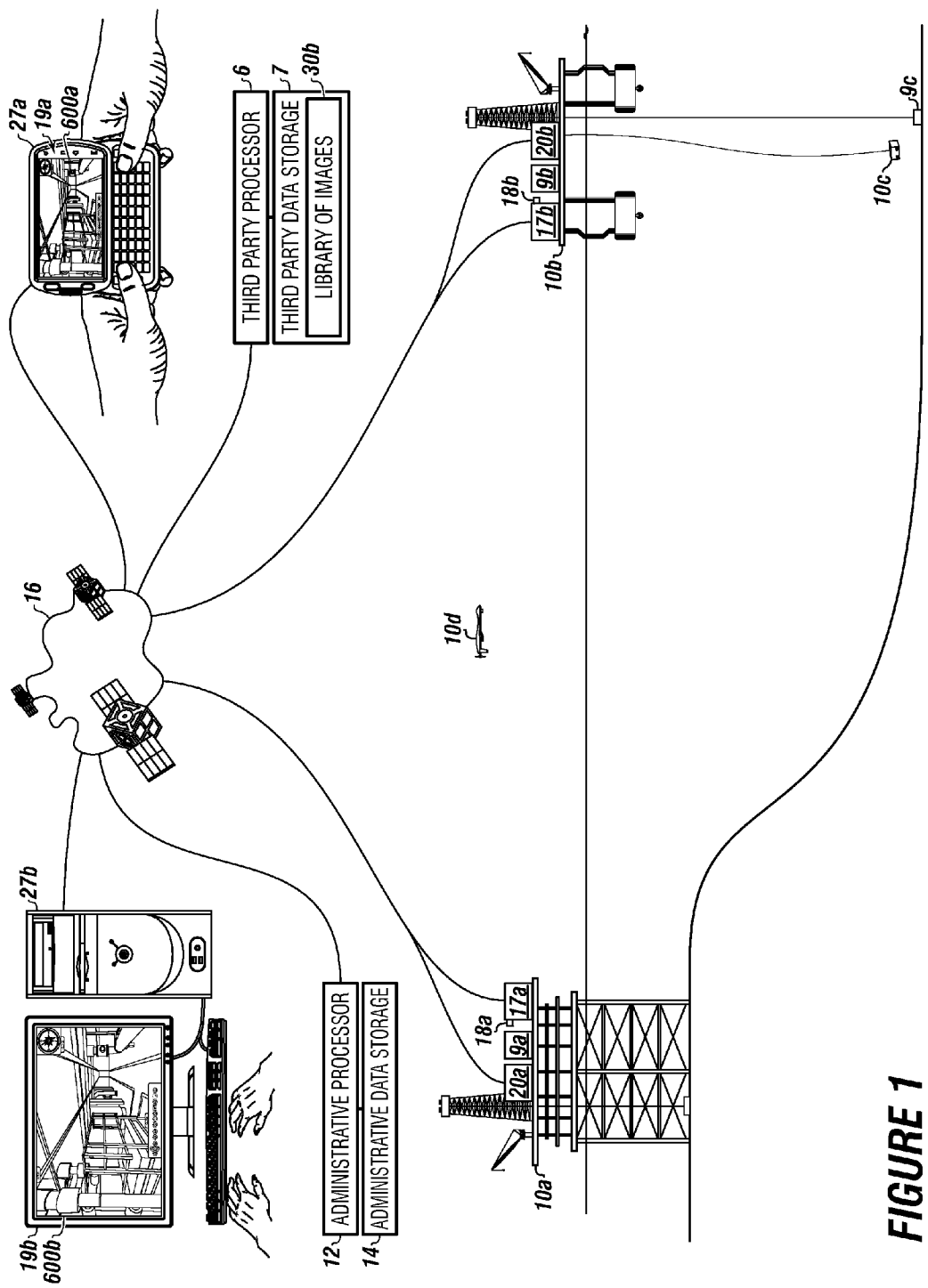
FIG. 1 depicts a system for monitoring plurality of telecommunication assets.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system for monitoring a plurality of telecommunication assets on at least one telecommunication structure.

The system can use a networked administrative processor and data storage, and independent survey set ups directed to a telecommunication asset of a telecommunication structure.

The system can use a global positioning system differential receiver/transmitter or a local grid.

The system can create a customer profile, and a library of telecommunication assets connected to an icon with a hyperlink and connected to a library of images of the telecommunication asset.

The system can use each independent survey set up mounted on or proximate to the telecommunication structure.

The system can form an executive dashboard receiving images and information from (i) each independent survey set up and (ii) the library of survey set ups and displaying a customer name or telecommunication structure identifier on an image of the telecommunication asset and showing the icon virtually positioned on the telecommunication asset, enabling a customer using the executive dashboard to toggle from the image to the library of survey set ups.

The system helps prevent the death of a worker by providing status of the telecommunication structure by means of providing a visual image of the work environment and contributing to a safe and effective workplace.

The system helps prevent injuries by visualizing and identifying hazards to workers in advance of work being carried out on the telecommunication structure.

The system helps prevent injuries by visually identifying trip hazards and undertaking suitable risk assessments in advance of future work being carried out on the telecommunication structure.

The system helps prevent explosions and fires by identifying areas of highest risk ahead of any maintenance work being carried out.

The system helps prevent environmental harm by providing early detection of exigent hazards that can lead to an environmental disaster.

The following definitions are used herein:

The term "administrative processor" as used herein can refer to a computer, a laptop, a personal digital assistant, a cellular telephone, a tablet computer or similar device capable of processing digital data and presenting digital images. The term can include a plurality of computers connected together, such as cloud computing processing.

The term "administrative data storage" as used herein can refer to a hard drive, cloud based data storage devices connected in parallel or in series, a jump drive, a portable hard drive or combinations thereof.

The term "data capture devices" as used herein can refer to cameras that record video images or sensors that detect temperature and pressure. Data capture devices can include underwater cameras, which can be video or still, and/or laser survey instruments. Data capture devices can include portable laser scanners that can be hand held. Data capture device can be positioned topside and underwater. Data capture devices can include sonar devices. Data capture devices can be mounted to tethered or untethered remotely operated vehicles (ROVs). Data capture devices can be mounted to unmanned aerial vehicles, such as drones or boats. The data capture device can be mounted to an autonomous underwater vehicle. Often the data capture devices can be mounted on tripods.

The term "client device" as used herein can refer to a laptop, a computer, a cellular telephone, a digital personal assistant, a tablet computer, and various combinations thereof that can receive the images of multiple independent survey set ups on the display of the client device.

The term "customer profile" as used herein can refer to a customer name, a customer billing address, a survey date, a customer user identification, a customer password, a customer security question and answer, a telecommunication structure name, global positioning system coordinates for the named telecommunication structure, asset address in the telecommunication structure local zone system, including a height above or below a water line, and asset specification. Each customer profile can have a library of telecommunication assets which includes specifications on the telecommunication assets. The library of telecommunication assets for each customer identifies each telecommunication asset on the telecommunication structure to be used in a telecommunication structure local zone system. The customer profile can include addresses and identifications of each independent survey set up. Each customer profile can have a link enabling a user to connect to the actual independent survey set ups via a network to view images remotely, such as on client devices like a laptop or cellular telephone. Each link can enable a customer to view the telecommunication assets using each independent survey set up in real time, as well as view historic recorded images. Each customer profile can contain information downloaded from each independent survey set up processor and independent survey set up data storage on equipment specifications of the independent survey set up, maintenance records of the independent survey set ups as well as recorded images.

The term "customer provided origin" as used herein can refer to a customer identified "zero," such as a well location or "well number 1" as a reference point on or proximate to the telecommunication structure, such as a drilling platform. The customer provided origin can include a "local grid" as the term is defined herein.

The term "global positioning system differential receiver/transmitter" as used herein can refer to a global positioning system device which identifies the location of the telecommunication structure on the planet with WGS-84 coordinates, which can be transformed to a local coordinate system with longitude and latitude coordinates or xy coordinates. In embodiments, the global positioning system differential receiver/transmitter can be used to identify the location of each telecommunication asset on the planet and be used to identify each independent survey set up on the telecommunication structure.

The term "independent survey set ups" as used herein can refer to an assembly of connected equipment including a data capture device with a survey set up processor with bidirectional telecommunication. The survey set up processor can be connectable with a power supply, such as rechargeable batteries or vessel power. Data storage connected to the survey set up data storage can provide temporary or portable memory storage of images from the data capture device as well as data including GPS coordinates, actual proximate equipment names, height from decks and ceiling, camera specifications including lenses, and age and model of cameras. Each independent survey set up in embodiments can communicate with another independent survey set up as well as a network to communicate with the administrative processor of the system. The independent survey set up can include information on mounting means, such as tripods, clamps, watertight underwater housings. In some embodiments, the independent survey set up can include additional lighting systems connected to the survey set up processor or the data capture device or both. The survey set up processor can store in the survey set up data storage information on the lighting such as lumens, watts, and type of light, such as "flash halogen," strobe or steady LED (light emitting diode) lights. In some embodiments, which the independent survey set ups can be mounted outside on a semisubmersible or jack up platform, the survey set up data storage can include information on protective housings, and dates of repair or inspection of the housing or entire independent survey set up as well as maintenance information on the independent survey set up. The independent survey set up processor can be a computer or device similar to the administrative processor.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "library of telecommunication assets" as used herein can refer to a customer defined set of telecommunication assets on the specific telecommunication structure. Each customer profile can have a library of telecommunication assets. Telecommunication assets can be valves, meter, pumps, gauges, switches, and/or pipes or any other telecommunication asset on the telecommunication structure. In the library of telecommunication assets, each telecommunication asset can have a specification, which can include a manufacturing date of the telecommunication asset, a maintenance schedule or schedule of repairs or inspections, and known defects. Each telecommunication asset can have additional information related to start date and end dates of maintenances for tracking service to the asset. In the library of telecommunication assets, each telecommunication asset can have an installation date. Each telecommunication asset can have a priority code, showing the importance of the telecommunication asset on the telecommunication structure. Some telecommunication assets are critical to operation of a drilling rig and have a high priority; other telecommunication assets are running the toilets of the crew accommodation and have a lower priority. The library of telecommunication assets can be customized to particular user needs and can include information such as manufacturing materials of telecommunication asset, color of the telecommunication asset, size, weight, and anticipated length of usable operation.

The term "library of images" as used herein can refer to images, drawings, figures, manufacturing information including dates of installation, dates of manufacture, maintenance records, and other text, which can include specifications on telecommunication assets which can be used on the telecommunication structure. The library of images can be digital, analog, or video images. Sonar read outs can also be in the library of images for underwater assets in particular. CAD drawings can be in the library of images. 3D simulations can be in the library of images as well as animations.

The term "library of survey set ups" as used herein can include information that comes directly from or relates to one or a plurality of independent survey set ups: (i) equipment specifications on data capture devices used in independent survey set ups, such as a camera make, model, and specifications; (ii) an address of the independent survey set up in a telecommunication structure local zone system or a local grid; (iii) a live video feed, a stored video feed, or still photos of the telecommunication assets, and can include sonar; (iv) laser information on lasers used in independent survey set ups; (v) semi-temporary targets identified for establishing the location of the telecommunication asset in the telecommunication structure local zone system; (vi) at least two and possibly three x, y, and z coordinates locating the independent survey set up in the telecommunication structure local zone system; (vii) support device information on equipment used to support the data capture device, such as a camera or the laser or both at a preferred height, an elevation above a mean water level, such as a tripod; (viii) a distance from the telecommunication structure; (ix) sources of power supply for each independent survey set up on the telecommunication structure, such as oil rig or vessel supplied power or batteries or a fuel cell; (x) an indication of how the digital transfer of data occurs from the independent survey set ups to the administrative data storage; (xi) survey set up identifiers; (xii) data capture device codes, (xiii) transmission connection descriptions, (xiii) information on a time line of the data capture device; (xiv) a job project name; (xv) a customer name or customer code; and (xvi) a telecommunication structure name or code.

The term "local grid" refers to a customer defined location system developed for a specific telecommunication structure. The local grid identifies using a geolocation system for telecommunication assets specifically by at least one of: a height, an angle, or a distance to certain markers, monuments or identified positions indicated by the customer on the telecommunication structure. In embodiments, the system ties the independent survey set ups to the local grid system and then connects the grid to the network enabling independent survey set ups to be trackable along with telecommunication assets using a customer's local grid of the telecommunication structure.

The term "network" as used herein can refer to a cellular network, the internet, another global telecommunication system, a local area network, a wide area network, a satellite network, or combinations thereof. The network can be the client's own private network or a third party cloud network.

As the term is used herein, "telecommunication structures" can refer to a facility or a tower, a fixed or floating vessel, or an underwater structure. The telecommunication structure can be a drilling rig, a semisubmersible platform, a tension leg platform, a floating production and storage vessel, a floating storage unit, a platform, or underwater equipment connected to the telecommunication structure, such as an remotely operated vehicle (ROV) viewing an open hole section of a subsea well or a manifold, or a plan pipeline.

The term "telecommunication structure local zone system" as used herein can refer to a local zone system created for identified assets on the telecommunication structure using a customer provided origin which can have a linear dimension. The telecommunication structure local zone system can be a survey of the entire structure or a portion of the structure.

The term "real time" as used herein can refer to the most recent captured data from a data set or from an independent survey set up. The invention allows multiple customers to view in real time simultaneously captured data from multiple data capture devices on the telecommunication structure. Real time refers to an ability to display the captured data 24 hours a day, 7 days a week, continuously.

The term "telecommunication asset" as used herein can refer to an underwater asset, such as a wellhead, a manifold, a pipeline, ends of pipelines and manifolds. An underwater telecommunication asset can be a jacket and a pipeline riser or similar underwater assets. The term "telecommunication asset" also can refer to above water assets, including but not limited to meters, pumps, gauges and mechanical devices including pipes, and other structural elements on the telecommunication structure. A telecommunication asset can be a moored platform, a moored boat, and/or a moored barge.

The term "hyperlink" as used herein can refer to data that the customer or user can directly follow either by clicking on or by hovering over using a mouse or other indicator and which can then be followed automatically to another document in another data storage or in an electronic library at another location. A hyperlink can point to a whole document or to a specific element within a document.

The term "laser analysis software" refers to commercially available software that allows a customer using the executive dashboard to perform real time measurements of the telecommunication asset with the data capture device, from the executive dashboard. Commercially available laser analysis software can be purchased from Leica Geosystems of the United Kingdom.

In embodiments, the system can be for monitoring a plurality of telecommunication assets on at least one of a plurality of telecommunication structures. The system can have an administrative processor, which can be connected to a network, and can be connected to an administrative data storage and one or more independent survey set ups connected to the network with each of the independent survey set ups directed to a telecommunication asset, wherein each independent survey set up can have at least one data capture device.

The system can further include a customer provided origin stored in the customer profile and a global positioning system differential receiver/transmitter or a local grid for the plurality of telecommunication structures. The system can further include computer instructions in the administrative data storage for instructing the administrative processor to create the customer profile and to store the customer profile in the administrative data storage.

The system can include computer instructions in the administrative data storage to instruct the administrative processor to form a library of telecommunication assets for a telecommunication structure monitored using the independent survey set ups. The library of telecommunication assets in the customer profile includes a plurality of telecommunication assets, wherein each telecommunication asset can have an icon with a hyperlink to a library of images in the administrative data storage or to a library of images in the third party data storage.

The system can further include computer instructions in the administrative data storage to instruct the administrative processor to create a library of survey set ups capturing information from each independent survey set up mounted on or proximate to the telecommunication structure; and computer instructions to identify placement locations of independent survey set ups in a created telecommunication structure local zone system of the telecommunication structure or a local grid of the telecommunication structure, thereby enabling each independent survey set up to monitor telecommunication assets identified from the library of telecommunication assets.

The system can include computer instructions to instruct the administrative processor to form an executive dashboard for display on at least one client device of a customer. The executive dashboard can receive from (i) each independent survey set up and (ii) the library of survey set ups and can display (a) a customer name or (b) an telecommunication structure name. The executive dashboard can display an image of the telecommunication asset and an icon virtually positioned on the telecommunication asset. The virtually positioned icon presents a hyperlink to the library of survey set ups for that telecommunication asset enabling a customer using the executive dashboard to toggle from the image to the library of survey set ups for each telecommunication asset being monitored by an independent survey set up. The executive dashboard can additionally display placement locations of a plurality of telecommunication assets on the telecommunication structure.

The embodiments relate to systems for monitoring telecommunication assets on telecommunication structures using a processor, data storage, and a network to connect to at least one client device. The system uses a plurality of independent survey set ups and computer instructions to form a telecommunication structure local zone system using a customer provided origin.

The system can create a library of telecommunication assets, use a library of images, and create a library of survey set ups of independent survey set ups, to survey the telecommunication structure.

The system can target customer identified telecommunication assets within the surveyed telecommunication structure for monitoring in real time and for monitoring from remote locations by one or more users of client devices connected to the network.

The system can use computer instructions to create a telecommunication structure local zone system, to place or move independent survey set ups to target telecommunication assets of the telecommunication structure.

The system can collect and transfer data from the independent survey set ups and form a viewable image of the telecommunication assets, and create a viewable local coordinate network of assets which can be seen on an executive dashboard.

Turning now to the Figures, FIG. 1 depicts a system for monitoring a plurality of telecommunication assets 9a-9c associated with at least one of a plurality of telecommunication structures 10a-10d.

The telecommunication assets can be pumps, meters gauges, or other assets on the telecommunication structure, which are generally fixed to the telecommunication structure.

Telecommunication structure 10a is depicted as a drilling platform. Telecommunication structure 10b is shown as a floating vessel. Telecommunication structure 10c is shown as a remotely controlled vehicle looking at a telecommunication asset 9c, shown as a subsea well. Telecommunication structure 10d is shown as an unmanned aerial vehicle. Autonomous underwater vehicles can be one of the telecommunication structures.

In an embodiment, the system can be used to monitor telecommunication assets on one level of a drilling semisubmersible in the North Sea.

The equipment of the system can include an administrative processor 12 with administrative data storage 14. The administrative processor in embodiments can be a computer located remote from the offshore asset. The administrative processor can be a computer with a data storage which can be hard drives, supplemented portable data storage, or a jump drive.

The administrative processor 12 can be connected to a network 16 which can connect to the telecommunication assets. In embodiments, two or more networks can be used, such as a satellite network connecting to the oil rig and the internet connected to the administrative processor.

The system can include a plurality of independent survey set ups 17a and 17b with each independent survey set up having one or more data capture devices 18a and 18b. The independent survey set ups with data capture devices can be mounted to the telecommunication structures and connected to the network.

The data capture devices can connect directly or be in communication to a local area network on the telecommunication structure, such as a local area network on a facility or a tower which in turn connects to a satellite network.

Global positioning system differential receiver/transmitters 20a and 20b on the telecommunication structure can communicate to the administrative processor through the network 16, enabling the system to correctly locate the telecommunication structure.

Client devices 27a and 27b can be connected to or in communication with the network 16. The client devices can each have a processor, data storage and a display 19a and 19b which can show executive dashboards 600a and 600b.

A third party processor 6 can be connected to the network. The third party processor 6 can communicate with a third party data storage 7 that contains a library of images 30b which can be accessed by the administrative processor for use in the system.

Figure 2B:
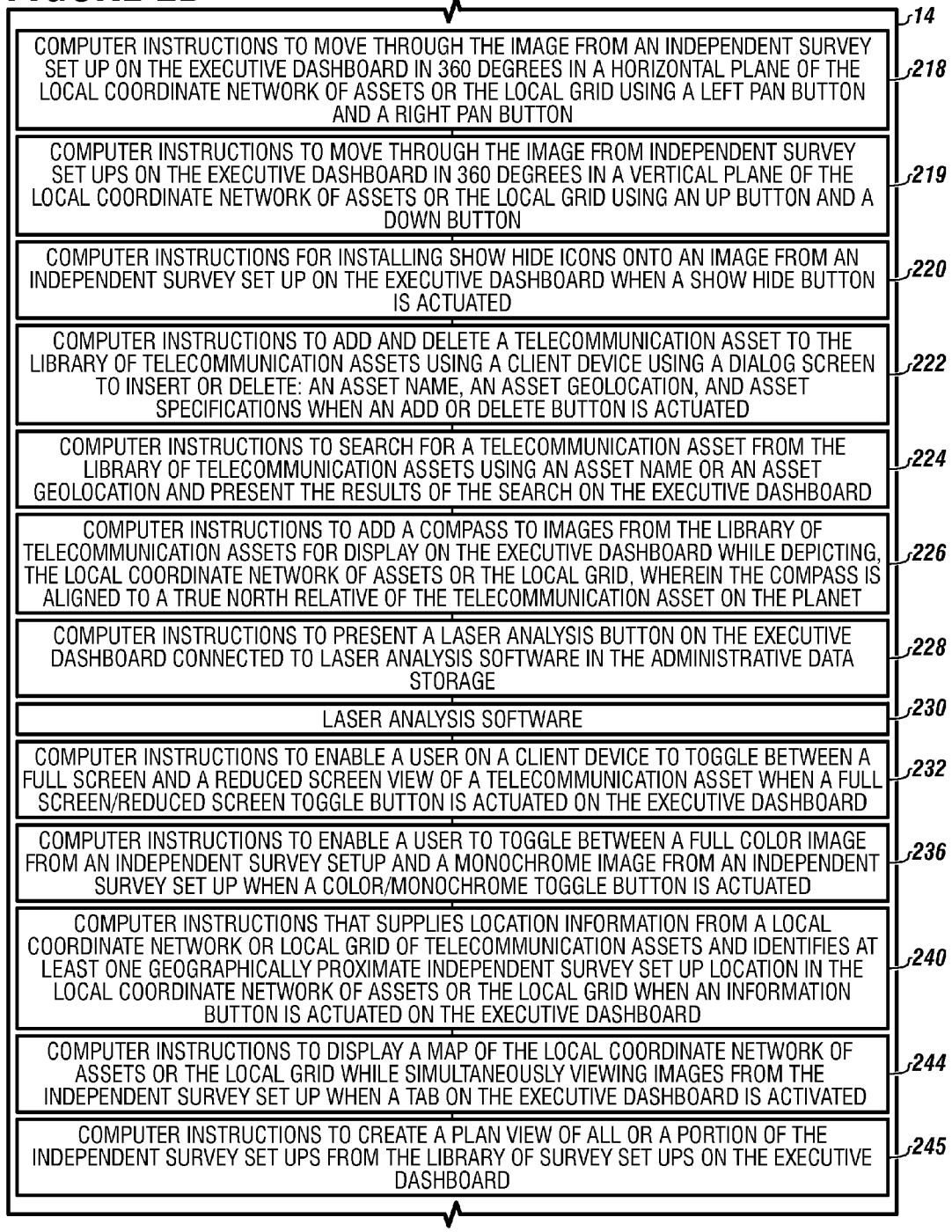
Figure 2C:
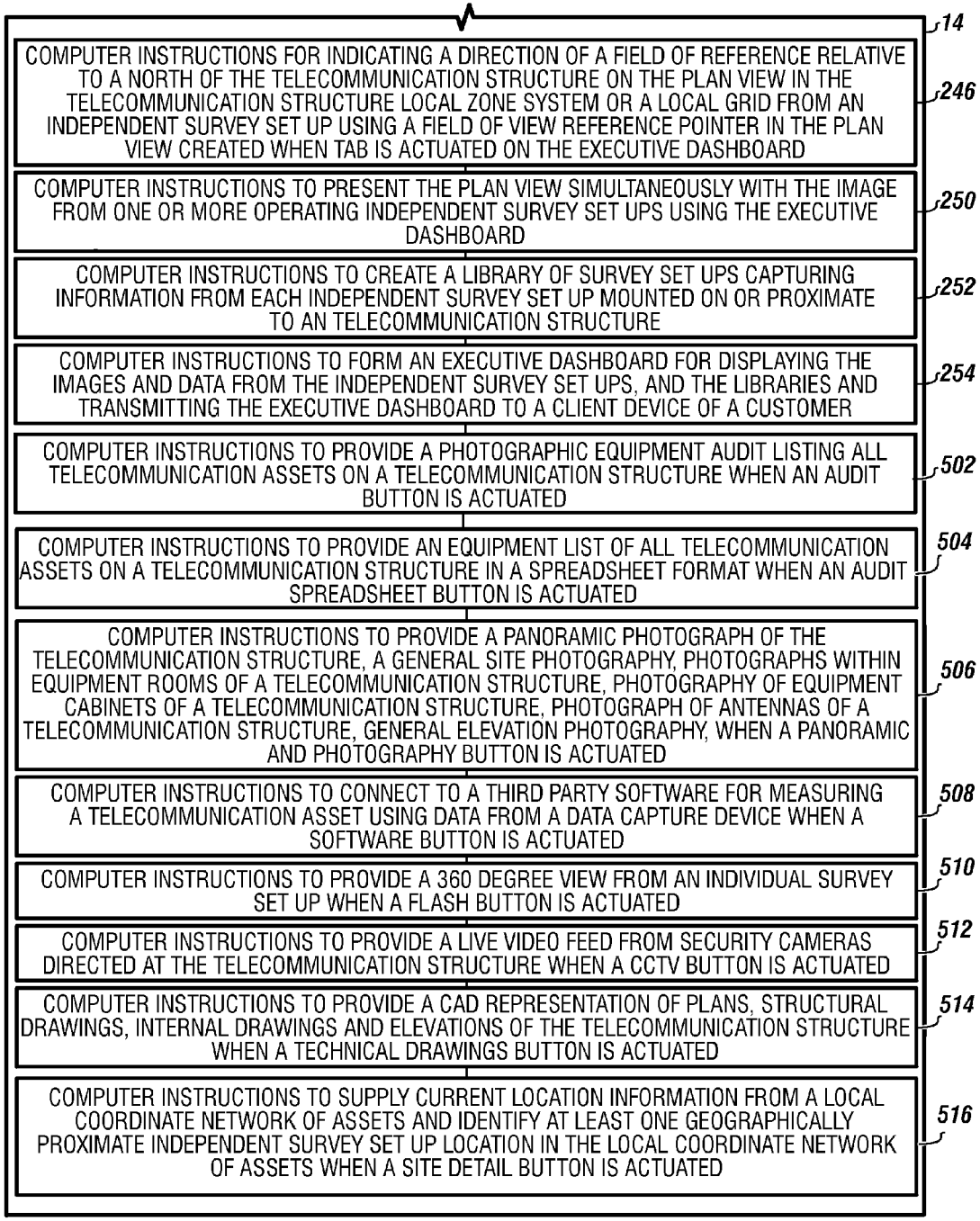

FIGS. 2A-2C depict a diagram the administrative data storage.

The administrative data storage 14 can include a customer profile 22.

The customer profile 22 can include a customer name 302, an telecommunication structure name or code 314, a global positioning system coordinate for the named or coded telecommunication structure 316, a customer provided origin 318, a quantity of independent survey set ups on the telecommunication structure 319, an telecommunication structure local zone system 320, and a library of telecommunication assets 322.

The library of telecommunication assets 322 can include for each telecommunication asset 324, a telecommunication asset name. Each telecommunication asset can have a hyperlink 33 to at least one of plurality of files in a library of images in the administrative data storage or in a library of images in the third party data storage connected to the third party processor in telecommunication with the network.

For example, a hyperlink can be www.use.utec.com/libraryofsurveyset_ups/Shell/bullwinkle.

The administrative data storage can include a library of images 30a containing a plurality of files 31, each file containing information on the telecommunication assets in general, such as manufacturer information, and origin of manufacture and an image 32 of the telecommunication asset.

The administrative data storage can contain the library of survey set ups 400.

The system can include a plurality of computer instructions stored in the administrative data storage to instruct the administrative processor to perform the following various tasks.

The administrative data storage can include computer instructions 200 to create a customer profile and store the customer profile in the administrative data storage.

The administrative data storage can include computer instructions 202 to create an telecommunication structure local zone system using the customer provided origin and store the telecommunication structure local zone system connected to the customer profile in the administrative data storage enabling a customer to view as a graphic image, the telecommunication assets and the independent survey set ups positioned on the telecommunication structure in the telecommunication structure local zone system.

The administrative data storage can include computer instructions 206 to identify placement locations of independent survey set ups in a created local zone system of the telecommunication structure or a local grid of the telecommunication structure enabling each independent survey set up to monitor telecommunication assets identified from the library of telecommunication assets.

The administrative data storage can include computer instructions 214 to present multiple independent survey set ups simultaneously on the executive dashboard and displaying multiple telecommunication assets of the telecommunication structure on the executive dashboard simultaneously.

The administrative data storage can include computer instructions 216 to zoom in and zoom out on an image from independent survey set ups on the executive dashboard when a zoom in button or a zoom out button is actuated.

The administrative data storage can include computer instructions 217 to move through the image from the independent survey set ups on the executive dashboard in 360 degrees around an axis of a local coordinate network of assets or a local grid when a rotate button is actuated.

The administrative data storage can include computer instructions 218 to move through the image from an independent survey set up on the executive dashboard in 360 degrees in a horizontal plane of the local coordinate network of assets or the local grid using a left pan button and a right pan button.

The administrative data storage can include computer instructions 219 to move through the image from independent survey set ups on the executive dashboard in 360 degrees in a vertical plane of the local coordinate network of assets or the local grid using an up button and a down button.

The administrative data storage can include computer instructions 220 for installing show hide icons onto an image from an independent survey set up on the executive dashboard when a show hide button is actuated.

The administrative data storage can include computer instructions 222 to add and delete a telecommunication asset to the library of telecommunication assets using a client device using a dialog screen to insert or delete: an asset name, an asset geolocation, and asset specifications when the add or delete button is actuated.

The administrative data storage can include computer instructions 224 to search for a telecommunication asset from the library of telecommunication assets using an asset name or an asset geolocation and present the results of the search on the executive dashboard.

The administrative data storage can include computer instructions 226 to add a compass to images from the library of telecommunication assets for display on the executive dashboard while depicting the local coordinate network of assets or the local grid, wherein the compass is aligned to a true north relative to the telecommunication asset on the planet.

The administrative data storage can include computer instructions 228 to present a laser analysis button on the executive dashboard connected to laser analysis software in the administrative data storage.

In embodiments, the laser analysis button can have an image of a triangle on the button.

The administrative data storage can include laser analysis software 230.

In embodiments, the administrative data storage can include computer instructions 232 to enable a user on a client device to toggle between a full screen and a reduced screen view of a telecommunication asset when a full screen/reduced screen toggle button is actuated on the executive dashboard.

In embodiments, the administrative data storage can include computer instructions 236 to enable a user to toggle between a full color image from an individual survey set up and a monochrome image from an individual survey set up when a color/monochrome toggle button is actuated.

In embodiments, the administrative data storage can include computer instructions 240 that supplies location information from the local coordinate network of assets or the local grid of telecommunication assets and identifies at least one geographically proximate independent survey set up location in the local coordinate network of assets or the local grid when an information button is actuated on the executive dashboard.

The administrative data storage can include computer instructions 244 to display a map of the local coordinate network of assets or the local grid while simultaneously viewing images from the independent survey set up when a tab on the executive dashboard is activated.

The administrative data storage can include computer instructions 245 to create a plan view of all or a portion of the independent survey set ups from the library of survey set ups on the executive dashboard.

The administrative data storage can include computer instructions 246 for indicating a direction of a field of reference relative to a north of the telecommunication structure on the plan view in the telecommunication structure local zone system or the local grid from an independent survey set up using a field of view reference pointer in the plan view created when a tab is actuated on the executive dashboard.

The administrative data storage can include computer instructions 250 to present the plan view simultaneously with the image from one or more operating independent survey set ups using the executive dashboard.

The administrative data storage can include computer instructions 252 creating a library of survey set ups capturing information from each independent survey set up mounted on or proximate to an telecommunication structure.

The library of telecommunication assets can then be stored in the customer profile.

The administrative data storage can include computer instructions 254 to form the executive dashboard for displaying the images and data from the independent survey set ups, and the libraries and transmitting the executive dashboard to a client device of a customer.

In embodiments, the administrative data storage can include computer instructions 502 to provide a photographic equipment audit listing all telecommunication assets on a telecommunication structure when an audit button is actuated.

In embodiments, the administrative data storage can include computer instructions 504 to provide an equipment list of all telecommunication assets on a telecommunication structure in a spreadsheet format when an audit spreadsheet button is actuated.

In embodiments, the administrative data storage can include computer instructions 506 to provide a panoramic photograph of a telecommunication structure, a general site photography, photographs within equipment rooms of a telecommunication structure, photography of equipment cabinets of a telecommunication structure, photograph of antennas of a telecommunication structure, or general elevation photography, when a panoramic and photography button is actuated.

In embodiments, the administrative data storage can include computer instructions 508 to connect to a third party software for measuring an telecommunication asset using data from a data capture device when a software button is actuated.

In embodiments, the administrative data storage can include computer instructions 510 to provide a 360 degree view from an individual survey set up when a flash button is actuated.

In embodiments, the administrative data storage can include computer instructions 512 to provide a live video feed from security cameras directed at the telecommunication structure when a closed circuit television (CCTV) button is actuated.

In embodiments, the administrative data storage can include computer instructions 514 to provide a CAD representation of plans, structural drawings, internal drawings and elevations of the telecommunication structure when a technical drawings button is actuated.

In embodiments, the administrative data storage can include computer instructions 516 to supply current location information from a local coordinate network of assets and identify at least one geographically proximate independent survey set up location in the local coordinate network of assets when a site detail button is actuated.

Figure 3:
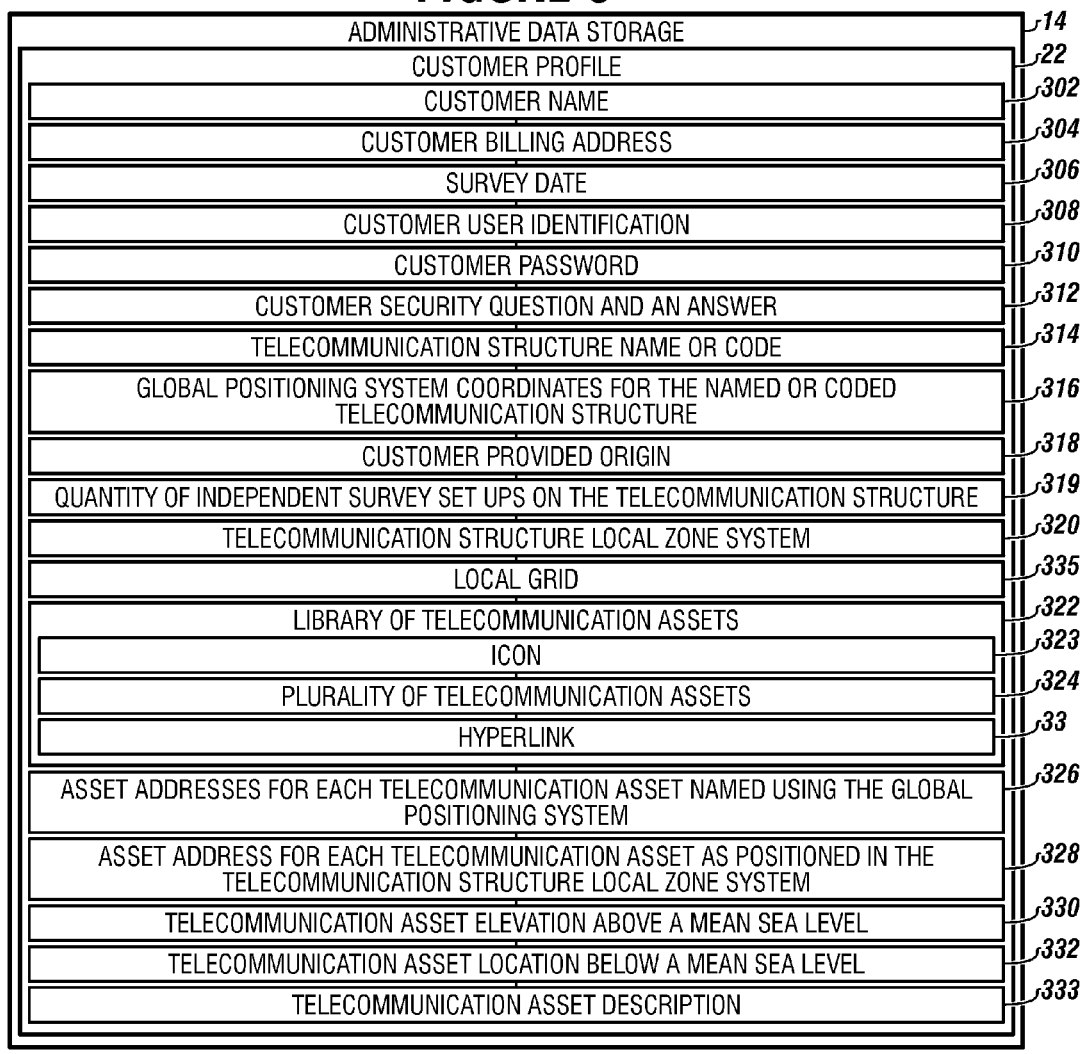
FIG. 3 depicts the customer profile that can be stored in the administrative data storage.

FIG. 3 depicts the customer profile 22 which can be stored in the administrative data storage 14.

A customer profile 22 can include a customer name 302, a customer billing address 304, a survey date 306 of an telecommunication structure, a customer user identification 308, a customer password 310, a customer security question and an answer 312; a telecommunication structure name or code 314, global positioning system coordinates for the named or coded telecommunication structure 316, a customer provided origin 318 for use in creating an telecommunication structure local zone system of the named telecommunication structure; a quantity of independent survey set ups on the telecommunication structure 319; and an telecommunication structure local zone system 320 containing the independent survey set ups.

The telecommunication structure local zone system can be created for the telecommunication structure to enable a customer to view as a graphic image, the telecommunication assets and the independent survey set ups positioned on the telecommunication structure in the telecommunication structure local zone system.

The customer profile can include a library of telecommunication assets 322.

The library of telecommunication assets can include, in embodiments, a plurality of telecommunication assets 324, an icon 323 for each telecommunication assets, and a hyperlink 33 connected to each icon 323 and to a library of images 30 in the administrative data storage or a library of images in a third party data storage.

The customer profile can contain asset addresses for each asset named using the global positioning system 326, an asset address 328 for each telecommunication asset as positioned in the telecommunication structure local zone system or the local grid 335 of the telecommunication structure, an asset elevation above a mean sea level 330, an asset location below a mean sea level 332, and an asset description 333.

The library of telecommunication assets can include a plurality of telecommunication assets, each telecommunication asset can have an icon 323 with a hyperlink 33 to a library of images 30 in the administrative data storage or to a library of images in a third party data storage.

A customer profile can include a plurality of libraries of telecommunication assets if the customer has a plurality of telecommunication structures, one library for each telecommunication structure.

Figure 4:
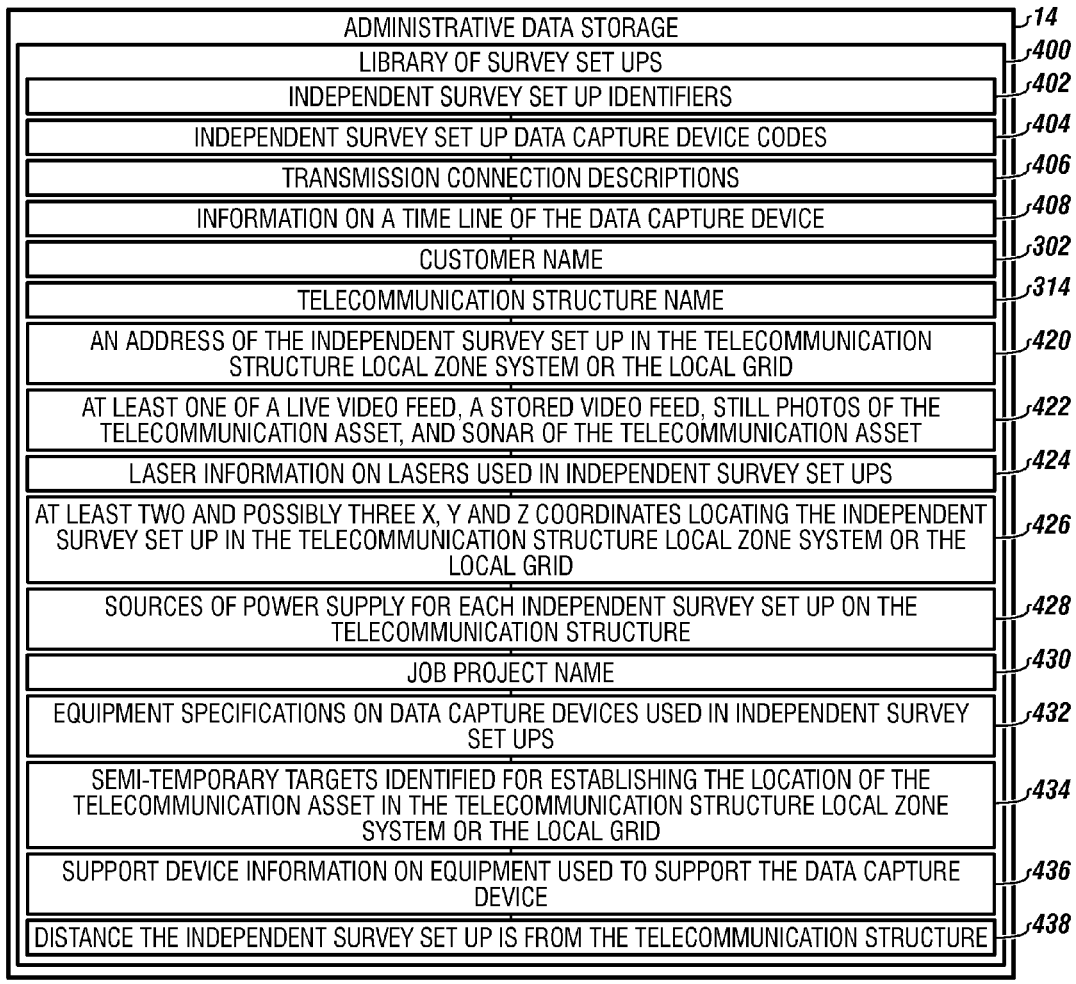
FIG. 4 depicts a display of an embodiment of an executive dashboard for a single telecommunication structure.

FIG. 4 depicts the library of survey set ups 400 in the administrative data storage 14.

The library of survey set ups can include (i) an address of the independent survey set up in the telecommunication structure local zone system or the local grid 420; (ii) at least one of: a live video feed, a stored video feed, still photos of the telecommunication asset, and sonar of the telecommunication asset 422; (iii) laser information on lasers used in independent survey set ups 424; (iv) at least two and possibly three x, y, and z coordinates locating the independent survey set up in the telecommunication structure local zone system or the local grid 426; (v) sources of power supply for each independent survey set up on the telecommunication structure 428; (vi) transmission connection descriptions 406 which are an indication of how the digital transfer of data occurs from the independent survey set ups to the administrative data storage; and (vii) a job project name 430.

The library of survey set ups can include at least one of: (i) equipment specifications on data capture devices used in independent survey set ups 432, such as a camera make, model, and specifications; (ii) semi-temporary targets identified for establishing the location of the telecommunication asset in the telecommunication structure local zone system or the local grid 434; (iii) support device information on equipment used to support the data capture device 436; (iv) a distance the individual survey set up is from the telecommunication structure 438; (v) independent survey set up identifiers 402; (xii) independent survey set up data capture device codes 404; (xiii) information on a timeline of the data capture device 408; (xv) a customer name or code 302; and (xvi) an telecommunication structure name 314 or telecommunication structure code.

The library of survey set ups can include independent survey set up identifiers 402, such as "C1-45" for a set up on a specific corner of level 3 of a drilling rig.

The library of survey set ups can include independent data capture device codes 404, such as a laser scanner coded as "Leica 6200".

The library of survey set ups can include transmission connection descriptions 406 that indicate how the data capture devices can transmit data to the network. For example, a transmission connection description can use a "jump drive."

For example, the timeline of the data capture device can be a date stamp indicating a month, day, year, and minutes when data capture starts and ends by the data capture device.

FIG. 5 shows a display of an embodiment of an executive dashboard.

The system uses computer instructions to form an executive dashboard 600.

The executive dashboard 600 displays data from (i) each independent survey set up and (ii) the library of survey set ups and can display information from the library of images.

The executive dashboard 600 shows a customer name 302 and telecommunication structure name or code 314.

The executive dashboard 600 can be displayed on the client device of the customer, as shown in FIG. 1.

The executive dashboard displays an image 32 of at least one telecommunication asset of the plurality of telecommunication assets 324 and an icon 323 virtually positioned on at least one telecommunication asset of the plurality of telecommunication assets 324.

The virtually positioned icon presents a hyperlink to the library of survey set ups for that telecommunication asset 324 enabling a customer using the executive dashboard 600 to toggle from the image 32 to the library of survey set ups for each telecommunication asset being monitored by an independent survey set up.

The executive dashboard can present navigation buttons for use on displayed images from the library of telecommunication assets, the local coordinate network of assets or combinations thereof on the executive dashboard as presented on the at least one client device connected to the network.

The executive dashboard allows a customer to move within the presented image of the telecommunication asset. The executive dashboard 600 can include a zoom in button 300 and a zoom out button 301, a rotate button 307, and show hide button 303.

A laser analysis button 305 showing a triangle can be presented on the executive dashboard to connect to laser analysis software in the administrative data storage.

The executive dashboard can include a full screen/reduced screen toggle button 317, a left pan button 327, and a right pan button 309. The executive dashboard can include an up button 325 and a down button 311. The executive dashboard can include an add and delete button 313 to add or delete a telecommunication asset from the plurality of telecommunication assets 324 to the library of telecommunication assets using at leas one client device.

The executive dashboard can include a color/monochrome toggle button 329 that allows a user to toggle between a full color image from the local coordinate network of assets and a monochrome image from the local coordinate network of assets.

The executive dashboard can include an information button 315 that supplies current location information from a local coordinate network of assets or the local grid and identifies at least one geographically proximate independent survey set up location in the local coordinate network of assets.

In this embodiment, a compass 321 can be displayed that depicts the orientation of the image from the data capture device to a north relative to the local asset zone system.

A tab 612 on the executive dashboard can activate computer instructions to display a map.

A semi-translucent asset tag 331, which can be generated when an add or delete button is actuated, is also shown. The semi-translucent asset tag can be saved to the library of telecommunication assets.

FIG. 6 shows that the executive dashboard can additionally display placement locations 680 of a plurality of telecommunication assets 324a-324f on the on the telecommunication structure.

The executive dashboard 600 can have navigation buttons for use on displayed images from the library of telecommunication assets and for use on a displayed local coordinate network of assets or combinations thereof.

A plan view from a perspective of a plurality of independent survey set up data capture devices each having an icon 323 while data from one specific capture device can be simultaneously presented on the executive dashboard.

In embodiments, plan views can drop down and be overlaid onto data capture images when the tab 612 is activated.

A pointer 614 can indicate a direction of a field of reference relative to a north of the telecommunication structure in the telecommunication structure local zone system.

FIGS. 7A-7B depict a sequence of steps usable with the system according to one or more embodiments.

In embodiments, steps of the system can be performed by the customer using at least one client device connected to the network and the administrative processor with administrative data storage as described.

The system can include creating a customer profile which can be stored in the administrative data storage or in a cloud computing data storage, as shown in step 801.

The customer can create the customer profile as defined herein, using at least one client device connected to the network.

The system can include providing a telecommunication structure name and telecommunication structure address for a telecommunication structure to be surveyed, as shown in step 803.

The system can include identifying a customer provided origin on the telecommunication structure for surveying, as shown in step 805.

The system can include identifying areas of the telecommunication structure for monitoring, such as surveying, as shown in step 807.

The system can include using an executive dashboard created using computer instructions in the administrative data storage to request surveying of identified portions of the telecommunication structure with the telecommunication structure address, as shown in step 809.

The system can include requesting creation and installation of independent survey set ups on the telecommunication structure which target customer identified telecommunication assets, as shown in step 810.

The system can include using computer instructions in the administrative data storage to instruct the administrative processor to create a telecommunication structure local zone system for the identified areas of the telecommunication structure or to use the local grid, as shown in step 811.

The system can include using computer instructions in the administrative data storage to instruct the administrative processor to identify optimum locations to place independent survey set ups with data capture devices oriented at the customer identified telecommunication assets, as shown in step 812.

The system can include using computer instructions in the administrative data storage to instruct the administrative processor to verify if independent survey set ups can be at the optimum locations or if independent survey set ups must be moved to different locations in order to capture more customer identified telecommunication assets providing a maximum coverage for a customer identified area of a telecommunication structure, as shown in step 813.

The system can include "turning on", such as powering up, the independent survey set ups to perform data capture of the customer identified telecommunication assets, as shown in step 814.

The system can include transferring data from operating independent survey set ups to the administrative data storage, as shown in step 815.

The system can include generating a library of survey set ups using information on the independent survey set ups and using computer instructions in the administrative data storage and storing the library of survey set ups in the administrative data storage, as shown in step 816.

The system can include using computer instructions in the administrative data storage to instruct the administrative processor to create a plan view of all or a portion of the independent survey set ups from the library of survey set ups can be created, as shown in step 817.

The system can include using computer instructions in the administrative data storage to instruct the administrative processor to enable a plan view to be viewed simultaneously with the data from one or more operating independent survey set ups using the executive dashboard, as shown in step 818.

The system can include using computer instructions in the administrative data storage to instruct the administrative processor to form a library of telecommunication assets for the specific telecommunication structure being surveyed with the independent set ups, as shown in step 820.

The system can include creating an icon connected to the library of telecommunication assets and installing the icon virtually over the image of the telecommunication asset generated from the data capture device, which can also include creating a hyperlink for the icon to the library of images and the customer profile in the administrative data storage, as shown in step 821.

In embodiments, creation of the icon includes creating a hyperlink for the icon to the library of images and the customer profile in the administrative data storage. In embodiments, the library of images can be in the third party data storage.

By linking the library of telecommunication assets to the library of survey set ups, the telecommunication assets can be monitored simultaneously with a plan view map using locations indicated in the telecommunication structure local zone system displayed on the executive dashboard.

The customer can now make decisions in real time on repair, maintenance, safety, and asset inventory control with this system, using at least one of the client devices of the customer, all of which can be remote from the telecommunication structure, or using at least one client device that is on or adjacent to the telecommunication structure.

The system can include using computer instructions and the executive dashboard to access and view related data of the telecommunication structures such as specification data, while viewing the data capture images and the plan view simultaneously from a plurality of client devices of the customer, simultaneously, as shown in step 824.

By means of the system for monitoring a plurality of telecommunication assets, the client device can tour any telecommunication structure with real time visualisation, accurate real world on screen measurements, using laser analysis software, and view/download all deliverables such as drawings, 3D models, photos, and reports through a library of images. All information can be derived from the latest data capture devices, allowing real time monitoring from remote locations by one or more users, providing ultimate confidence. A library of telecommunication assets can be incorporated into the ISITE™ system created by UTEC Survey, Inc. of Houston, Texas, intelligently linking, via a world area network, private network or third party cloud network.

Visualisation tools designed to revolutionise and consolidate asset management operations which are proven to increase productivity and reduce operational expenditures, while minimising accidents, environmental harm and broken bones by visualising and identifying hazards in advance of work being carried out on the telecommunication structure.

In one embodiment, the system can be for monitoring and displaying a plurality of telecommunication assets which are connected to a network, wherein the telecommunication assets are connected to or mounted on one or more telecommunication structures, wherein the system uses an executive dashboard displayed on a plurality of client devices simultaneously, wherein the client devices can be connected to the network. The system comprises an administrative processor connected to an administrative data storage, wherein the administrative processor can be connected to the network; a plurality of survey set ups, connected to the network, wherein each of the independent survey set ups can be directed to at least one telecommunication asset, each survey set up having at least one data capture device; a global positioning system differential receiver/transmitter on or proximate to a telecommunication structure for providing coordinates for at least one of the plurality of telecommunication assets, wherein the telecommunication structure can be a facility or a tower; and a customer provided origin stored in the customer profile. The system also includes computer instructions in the administrative data storage for creating a customer profile and storing the customer profile in the administrative data storage; computer instructions in the administrative data storage to create a telecommunication structure local zone system using the customer provided origin; computer instructions in the administrative data storage to store the telecommunication structure local zone system connected to the customer profile in the administrative data storage; computer instructions in the administrative data storage to form a library of telecommunication assets for the specific telecommunication structure being surveyed with the individual set ups, wherein the formed library of telecommunication assets in the customer profile comprises a plurality of telecommunication assets each having a hyperlink to a file in a library of images in the administrative data storage; computer instructions in the administrative data storage to create a library of survey set ups in the administrative data storage for a plurality of independent survey set ups mounted on or proximate to the telecommunication structure; computer instructions in the administrative data storage to form an executive dashboard for displaying the data capture information and information from the administrative processor; computer instructions in the administrative data storage to use the telecommunication structure local zone system to identify placement locations of independent survey set ups in the created telecommunication structure local zone system to monitor specific targets identified from the library of telecommunication assets; computer instructions in the administrative data storage to display the placement locations on an executive dashboard which can be transmitted from the administrative data storage via the network to a display of a client device connected to the network; computer instructions in the administrative data storage to transfer collected and stored data from the data capture devices of the independent survey set ups to the administrative data storage; computer instructions in the administrative data storage to populate the created telecommunication structure local zone system with the collected and stored data from the data capture devices thereby forming a local coordinate network of assets; and computer instructions in the administrative data storage to store the local coordinate network of assets in the administrative data storage for viewing on demand using the executive dashboard.

While these embodiments have been described with emphasis on the embodiments, it should be understood that within the scope of the appended claims, the embodiments might be practiced other than as specifically described herein.

What is claimed is:

1. A system for monitoring a plurality of telecommunication assets on at least one of a plurality of telecommunication structures, the system comprising:

a. an administrative processor connected to an administrative data storage, wherein the administrative processor is connected to a network;

b. a plurality of independent survey set ups connected to the network, with each of the independent survey set ups directed to a telecommunication asset, each of the independent survey set ups having at least one data capture device, the plurality of independent survey set ups comprising a survey set up processor connected to a survey set up data storage configured to provide temporary or portable memory storage of images from the at least one data capture device, and wherein the at least one data capture device is a camera and at least one of: a laser survey instrument, a portable laser scanner, and a sonar device;

c. a global positioning system differential receiver/transmitter that connects to a local grid for at least one of the plurality of telecommunication assets, wherein at least one telecommunication structure is a telecommunication facility or a telecommunication tower;

d. computer instructions in the administrative data storage to instruct the administrative processor to create a customer profile and store the customer profile in the administrative data storage;

e. a customer provided origin stored in the customer profile;

f. computer instructions in the administrative data storage to instruct the administrative processor to form a Library of Tagged Telecommunication Assets for the at least one telecommunication structure being monitored using each of the independent survey set ups, wherein the Library of Tagged Telecommunication Assets in the customer profile comprises a plurality of telecommunication assets, each telecommunication asset having an asset tag and an icon with a hyperlink to a Library of Images in the administrative data storage or to a Library of Images in a third party data storage;

g. computer instructions in the administrative data storage to instruct the administrative processor to create a Library of Survey Set Ups capturing information from each of the independent survey set ups mounted on or proximate to the at least one telecommunication structure;

h. computer instructions to identify placement locations of each of the independent survey set ups in a created telecommunication structure local zone system of the telecommunication structure or the local grid of the telecommunication structure enabling each of the independent survey set ups to monitor the plurality of telecommunication assets identified from the a Library of Tagged Telecommunication Assets; and i. computer instructions forming an executive dashboard for display on at least one client device of a customer, wherein the executive dashboard receives from (i) each of the independent survey set ups and (ii) the Library of Survey Set Ups and displays (a) a customer name or (b) an telecommunication structure name; wherein the executive dashboard displays an image of each of the telecommunication assets and a virtually positioned icon on each of the telecommunication assets, wherein the virtually positioned icon presents a hyperlink to the Library of Survey Set Ups for that telecommunication asset enabling the customer using the executive dashboard to toggle from the image to the Library of Survey Set Ups for each telecommunication asset being monitored by each of the independent survey set ups; wherein the executive dashboard displays placement locations of the plurality of telecommunication assets on the telecommunication structure.

2. The system of claim 1, further comprising computer instructions in the administrative data storage to instruct the administrative processor to present multiple independent survey set ups simultaneously on the executive dashboard and display multiple telecommunication assets on the executive dashboard.

3. The system of claim 1, further comprising computer instructions in the administrative data storage to instruct the administrative processor to provide general information and mapping imagery of a site when an information button is actuated.

4. The system of claim 1, further comprising computer instructions to provide a photographic equipment audit listing all telecommunication assets on a telecommunication structure when an audit button is actuated.

5. The system of claim 1, further comprising computer instructions in the administrative data storage to instruct the administrative processor to provide an equipment list of all telecommunication assets on a telecommunication structure in a spreadsheet format when an audit spreadsheet button is actuated.

6. The system of claim 1, further comprising computer instructions in the administrative data storage to instruct the administrative processor to provide a panoramic photograph of the telecommunication structure, a general site photography, photographs within equipment rooms of a telecommunication structure, photography of equipment cabinets of a telecommunication structure, photographs of antennas of a telecommunication structure, general elevation photography, or combinations thereof when a panoramic and photography button is actuated.

7. The system of claim 1, further comprising computer instructions in the administrative data storage to instruct the administrative processor to connect to a third party software for measuring a telecommunication asset using data from the at least one data capture device when a software button is actuated.

8. The system of claim 1, further comprising computer instructions in the administrative data storage to instruct the administrative processor to provide a 360 degree view from each of the independent survey set ups when a flash button is actuated.

9. The system of claim 1, further comprising computer instructions in the administrative data storage to instruct the administrative processor to provide a live video feed from security cameras directed at the telecommunication structure when a closed circuit television CCTV button is actuated.

10. The system of claim 1, further comprising computer instructions in the administrative data storage to instruct the administrative processor to provide a CAD representation of plans, structural drawings, internal drawings and elevations of the telecommunication structure when a technical drawings button is actuated.

11. The system of claim 1, further comprising computer instructions to add and delete a telecommunication asset to the Library of Tagged Telecommunication Assets using the at least one client device and using a dialog screen to insert or delete an asset name, an asset geolocation, and asset specifications when an add or delete button is actuated.

12. The system of claim 1, further comprising computer instructions in the administrative data storage to instruct the administrative processor to supply current location information from a local coordinate network of assets and identify at least one geographically proximate independent survey set up location in the local coordinate network of assets when a site detail button is actuated.

13. The system of claim 1, further comprising computer instructions in the administrative data storage to instruct the administrative processor to search for a telecommunication asset from the Library of Tagged Telecommunication Assets using an asset name or an asset geolocation.

14. The system of claim 1, further comprising computer instructions in the administrative data storage to add a compass to images from the Library of Tagged Telecommunication Assets, the local coordinate network of assets, or combinations thereof, wherein the compass is aligned to match a designation of north for the telecommunication structure.

15. The system of claim 1, further comprising computer instructions in the administrative data storage to instruct the administrative processor to display a map of the local coordinate network of assets while simultaneously viewing captured data from the at least one data capture device of each of the independent survey set ups.

16. The system of claim 15, further comprising computer instructions in the administrative data storage to instruct the administrative processor to indicate a direction of a field of reference relative to a north of the telecommunication structure in the telecommunication structure local zone system from each of the independent survey set ups using a field of view reference pointer in a plan view.

17. The system of claim 1, further comprising computer instructions in the administrative data storage to instruct the administrative processor to create a plan view of all or a portion of the independent survey set ups from the Library of Survey Set Ups.

18. The system of claim 17, further comprising computer instructions to present the plan view simultaneously with the data from one or more operating independent survey set ups using the executive dashboard.

19. The system of claim 1, wherein the Library of Survey Set Ups comprises:
   a. independent survey set up identifiers;
   b. individual data capture device identifier codes;
   c. a transmission connection description, that indicates how each data capture device transmits data to the network;
   d. a time line of the data capture device;
   e. a customer name; and
   f. a telecommunication structure name.

* * * * *